US008978967B2

(12) United States Patent  (10) Patent No.: US 8,978,967 B2
Gamboa et al.  (45) Date of Patent: Mar. 17, 2015

(54) INTELLIGENT FASTENER SYSTEM

(75) Inventors: James D. Gamboa, Anaheim, CA (US); Raymond J. Slesinski, Arnold, MO (US); William P. Zanteson, Monrovia, CA (US); Leslie A. Hoeckelman, O'Fallon, MO (US)

(73) Assignee: The Boeing Campany, Chicago, IL (US)

( * ) Notice: Subject to any disclaimer, the term of this patent is extended or adjusted under 35 U.S.C. 154(b) by 0 days.

(21) Appl. No.: 12/552,895

(22) Filed: Sep. 2, 2009

(65) Prior Publication Data

US 2011/0113613 A1  May 19, 2011

Related U.S. Application Data

(63) Continuation-in-part of application No. 11/931,628, filed on Oct. 31, 2007, now Pat. No. 7,703,669.

(51) Int. Cl.
*G06F 17/00* (2006.01)
*G06K 7/10* (2006.01)
*B23Q 17/00* (2006.01)
*G05B 19/418* (2006.01)

(52) U.S. Cl.
CPC .. *G05B 19/4183* (2013.01); *G05B 2219/31304* (2013.01)
USPC ..................................... 235/375; 29/407.04

(58) Field of Classification Search
CPC .......... G06K 7/01; G06K 7/10; G06K 9/228; G06K 9/00979; G06F 17/30256
USPC ............. 235/375, 462.01–462.49; 29/407.01, 29/407.04
See application file for complete search history.

(56) References Cited

U.S. PATENT DOCUMENTS

| 4,114,428 | A | 9/1978 | Popenoe |
| RE30,183 | E | 1/1980 | Popenoe |
| 4,294,122 | A | 10/1981 | Couchman |
| 4,333,351 | A | 6/1982 | Bickford |
| 4,344,216 | A | 8/1982 | Finkelston |
| 4,375,121 | A | 3/1983 | Sigmund |
| 4,602,511 | A | 7/1986 | Holt |
| 4,791,838 | A | 12/1988 | Bickford et al. |
| 4,846,001 | A | 7/1989 | Kibblewhite |
| 4,899,591 | A | 2/1990 | Kibblewhite |
| 5,018,988 | A | 5/1991 | Kibblewhite |

(Continued)

FOREIGN PATENT DOCUMENTS

| DE | 19746272 A1 | 4/1999 |
| DE | 199 17 222 A1 | 11/2000 |

(Continued)

OTHER PUBLICATIONS

US Patent and Trademark Office, Office Action Dated Oct. 4, 2012 for U.S. Appl. No. 12/536,438.

(Continued)

*Primary Examiner* — Michael G Lee
*Assistant Examiner* — Laura Gudorf
(74) *Attorney, Agent, or Firm* — Parsons Behle & Latimer

(57) ABSTRACT

A method and apparatus are used to visually recognize and install fasteners on a structure. An electronic image of the fastener is recorded, and is processed by a computer operated image recognition program to identify the fastener. The computer provides installation instructions and an installation tool based on the identity of the fastener.

19 Claims, 9 Drawing Sheets

(56) References Cited

U.S. PATENT DOCUMENTS

| | | | |
|---|---|---|---|
| 5,029,480 A | 7/1991 | Kibblewhite | |
| 5,112,248 A | 5/1992 | Kibblewhite | |
| 5,131,276 A | 7/1992 | Kibblewhite | |
| 5,205,176 A | 4/1993 | Kibblewhite | |
| 5,216,622 A | 6/1993 | Kibblewhite | |
| 5,220,839 A | 6/1993 | Kibblewhite | |
| 5,412,582 A | 5/1995 | Hesthamar et al. | |
| 5,437,525 A | 8/1995 | Bras | |
| 5,884,232 A | 3/1999 | Buder | |
| 6,009,380 A | 12/1999 | Vecchio | |
| 6,009,759 A | 1/2000 | Kibblewhite | |
| 6,263,268 B1 | 7/2001 | Nathanson | |
| 6,327,921 B1 | 12/2001 | Hsu | |
| 6,354,152 B1 | 3/2002 | Herlik | |
| 6,358,051 B2 | 3/2002 | Lang et al. | |
| 6,501,211 B1 | 12/2002 | Nasrollahzadeh | |
| 6,691,007 B2 | 2/2004 | Haugse | |
| 6,965,835 B2 | 11/2005 | McGee et al. | |
| 6,988,026 B2 | 1/2006 | Breed | |
| 6,990,866 B2 | 1/2006 | Kibblewhite | |
| 7,136,785 B2 | 11/2006 | Mast et al. | |
| 7,180,404 B2 | 2/2007 | Kunerth | |
| 7,246,980 B2 | 7/2007 | Azzalin | |
| 7,369,966 B1 | 5/2008 | Scelsi et al. | |
| 7,412,808 B2 | 8/2008 | Lavi | |
| 7,412,898 B1 | 8/2008 | Smith | |
| 7,441,462 B2 | 10/2008 | Kibblewhite | |
| 7,559,135 B2 | 7/2009 | Rode | |
| 7,680,565 B2 | 3/2010 | Balasu et al. | |
| 7,703,669 B2 | 4/2010 | Amirehteshami et al. | |
| 7,983,854 B2 | 7/2011 | O'Brien | |
| 2002/0162889 A1* | 11/2002 | Navon | 235/462.14 |
| 2003/0030564 A1 | 2/2003 | Boyce et al. | |
| 2003/0158676 A1 | 8/2003 | Fields et al. | |
| 2003/0205187 A1 | 11/2003 | Carlson et al. | |
| 2004/0065154 A1 | 4/2004 | Kibblewhite | |
| 2004/0067120 A1 | 4/2004 | Spper | |
| 2004/0208372 A1* | 10/2004 | Boncyk et al. | 382/181 |
| 2005/0027826 A1 | 2/2005 | Loda | |
| 2006/0009924 A1 | 1/2006 | McGee et al. | |
| 2006/0025897 A1 | 2/2006 | Shostak | |
| 2006/0109118 A1 | 5/2006 | Pelo et al. | |
| 2006/0130590 A1 | 6/2006 | Kibblewhite | |
| 2006/0214789 A1 | 9/2006 | Posamentier et al. | |
| 2006/0243056 A1 | 11/2006 | Sundermeyer et al. | |
| 2006/0285441 A1 | 12/2006 | Walker et al. | |
| 2008/0061145 A1* | 3/2008 | McGushion | 235/462.13 |
| 2008/0061984 A1 | 3/2008 | Breed | |
| 2008/0110091 A1 | 5/2008 | Perkins et al. | |
| 2008/0115589 A1* | 5/2008 | DeRose et al. | 73/862.23 |
| 2008/0115636 A1 | 5/2008 | DeRose | |
| 2008/0178713 A1* | 7/2008 | Long et al. | 81/467 |
| 2009/0038401 A1 | 2/2009 | Kibblewhite | |
| 2009/0038402 A1 | 2/2009 | Kibblewhite | |
| 2009/0071078 A1 | 3/2009 | Rakow et al. | |
| 2009/0112925 A1 | 4/2009 | Amirehteshami | |
| 2009/0128169 A1 | 5/2009 | Fay | |
| 2009/0157358 A1 | 6/2009 | Kim | |
| 2009/0218891 A1 | 9/2009 | McCollough, Jr. | |
| 2009/0249878 A1 | 10/2009 | Faber et al. | |
| 2010/0050778 A1 | 3/2010 | Herley et al. | |
| 2010/0100338 A1 | 4/2010 | Vik et al. | |
| 2010/0116887 A1* | 5/2010 | Barkan et al. | 235/440 |

FOREIGN PATENT DOCUMENTS

| | | |
|---|---|---|
| DE | 19917222 A1 | 11/2000 |
| EP | 1 188 521 A2 | 3/2002 |
| EP | 1188521 A2 | 3/2002 |
| WO | WO2007034197 A1 | 3/2007 |
| WO | PCT/US2010/044663 | 11/2010 |
| WO | WO2011028362 A1 | 3/2011 |

OTHER PUBLICATIONS

"Manufacturers Find Perfect Bolt Preload—Visually": Bruce Vernyi, Jul. 22, 2008 Freelance writer based in Glendale, CA, for Strees Indicators, Inc: Bruce Vernyi, Editor-in-Chief of American Machinist.

US Patent and Trademark Office, Office Action for U.S. Appl. No. 12/691,796 dated Jul. 19, 2012.

US Patent and Trademark Office, Final Office Action for U.S. Appl. No. 12/691,796 dated Jan. 11, 2013.

US Patent and Trademark Office; Office Action for U.S. Appl. No. 12/536,438 dated Nov. 8, 2011.

US Patent and Trademark Office; Final Office Action for U.S. Appl. No. 12/536,438 dated Feb. 22, 2012.

US Patent and Trademark Office; Office Actionfor U.S. Appl. No. 12/582,885 dated Dec. 16, 2011.

US Patent and Trademark Office; Final Office Actionfor U.S. Appl. No. 12/582,885 dated Jul. 17, 2012.

US Patent and Trademark Office; Office Action for U.S. Appl. No. 12/852,855 dated Feb. 25, 2013.

International Search Report for PCT/US2010/056888 dated Feb. 10, 2011.

Office Action for U.S. Appl. No. 12/852,855 dated Aug. 2, 2012.

European Patent Office, Examination report for EP Application No. 08253538.6 dated Aug. 3, 2012.

* cited by examiner 218
220

CZ 2876 LM
CZ 2877 LM
CZ 2878 LM
CZ 2879 LM
CZ 2880 LM
DZ 1390 LM          228         230
DZ 1391 LM

Nominal    As Installed
222 ~ Preload       124 kips   126 kips
224 ~ Torque        127 ft-lbs 129 ft-lbs
226 ~ Swage Force   336kN      331kN AR 1356 LB
AR 1357 LB
AR 1358 LB
AS 2789 LM
AS 2880 LM
AS 2881 LM
AS 2882 LM
BN 2900 LB
BN 2879 LB
BN 2880 LB
BN 2876 LM
BN 2877 LM
BN 2878 LM
BN 2879 LM
BN 2880 LM

FIG. 12

INTELLIGENT FASTENER SYSTEM

CROSS REFERENCE TO RELATED APPLICATIONS

This application is a continuation-in-part of U.S. patent application Ser. No. 11/931,628 filed Oct. 31, 2007, now U.S. Pat. No. 7,703,669 the entire disclosure of which is incorporated by reference herein.

TECHNICAL FIELD

This disclosure generally relates to the installation of fasteners, and deals more particularly with a method and apparatus for installing fasteners using computer generated fastener installation instructions based on automated fastener recognition.

BACKGROUND

Many of the existing fasteners and/or fastener collars are not marked with any manufacture information such as part number, lot number, and manufacturer, and are often only marked with a supplier name. The manufacture information is often only carried by the package containing the batch of fasteners. When the package is opened, this information is often lost or has to be manually transferred to a manufacturing record. Many of the existing methods of verifying compatibility of fastener elements rely on the manual checking of a table to verify compatibility. Similarly, many of the existing methods of ensuring that the fasteners are installed correctly rely on manually checking tables to determine proper loading settings. Likewise, many of the existing methods of locating, tracking, and/or monitoring fasteners rely on the use of manual tables. However, manually entering and checking tables may be time-consuming, unreliable, expensive, prone to error, and/or may experience other types of problems.

A fastening apparatus, and/or method of installing, locating, tracking, and/or monitoring a fastener is needed to decrease one or more problems associated with one or more of the existing fastening apparatus and/or methods.

SUMMARY

In accordance with a number of the disclosed embodiments, a method and apparatus are provided for installing fasteners in which the fasteners are identified using a machine vision system and a computer that generates installation instructions based on the identity of the fastener. The fastener is identified by recording an electronic image of the fastener, and wirelessly transmitting the image to the computer where it is processed by an image recognition program to determine the fastener's identity. Once identified, the computer retrieves installation instructions for the fastener from a database and wirelessly transmits these installation instructions to a tool used to install the fastener. Identification of the fastener is rapid and automated, which may reduce or eliminate incorrect installations. In some embodiments, recording of the image of the fastener may include recording an image of other features in the installation environment near the fastener which may be used to assist in verifying the identity of the fastener and to select appropriate installation instructions.

According to one disclosed embodiment, a method is provided of installing a fastener on a structure. The method includes recording an image of the fastener and identifying the fastener based on the recorded image. Electronic fastener installation parameters are retrieved based on the identity of the fastener. The fastener installation parameters are used to install the fastener on the structure. Identifying the fastener may be performed by a computer controlled image recognition program. Recording the image may include recording an image of at least one feature on the structure, and identifying the fastener may include identifying the feature.

According to another disclosed embodiment, a method is provided of installing a fastener on a structure using an installation tool. The method includes recording an electronic image of the fastener and transmitting the recorded image to a computer. The computer is used to identify the fastener based on the recorded image. The method also includes determining installation instructions for the identified fastener and transmitting the instructions from the computer to the installation tool. The installation tool is used to install the fastener according to the transmitted installation instructions. Recording the electronic image may be performed by a machine vision system, and determining the installation instructions may be performed by the computer. The method may further comprise recording an image of at least one feature on the structure, wherein identifying the fastener may include identifying the feature using the recorded image of the feature.

According to another embodiment, apparatus is provided for installing fasteners in a structure. The apparatus includes means for recording an image of a fastener to be installed and a programmed computer for identifying the fastener based on the recorded image and for generating installation instructions for the identified fastener. The apparatus further includes an installation tool for installing the fasteners on the structure according to the installation instructions. The apparatus may further comprise means for transmitting the image from the recording means to the computer and for transmitting the installation parameters from the computer to the installation tool. The transmitting means may comprise a wireless communications system. The apparatus may include an image recognition system used by the computer to identify the fastener. The apparatus may also include database including installation parameters for each of the plurality of fasteners.

These and other features, aspects and advantages of the disclosure will become better understood with reference to the following drawings, description and claims.

BRIEF DESCRIPTION OF THE ILLUSTRATIONS

FIG. 12 is an illustration of a display showing installation parameters for each of a plurality of fasteners.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
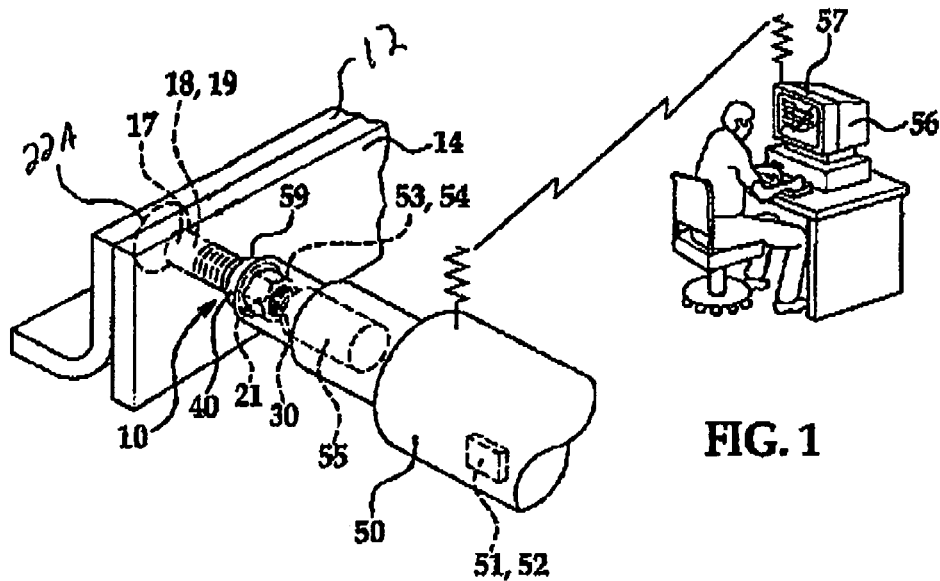
FIG. 1 shows a perspective view, with dashed lines showing hidden elements, of one embodiment of a fastening apparatus being attached with a tool to two components of an apparatus.

FIG. 1 shows a perspective view, with dashed lines showing hidden elements, of one embodiment of a fastening apparatus 10 being attached to two components 12 and 14 of an apparatus 16. The fastening apparatus 10 may comprise at least one of a fastener 18 and collar 21. The fastener 18 may comprise a one-piece fastener which may be attached without the use of collar 21, or may comprise a two-piece fastener which may be attached using collar 21. The fastener 18 may comprise an externally threaded bolt 19 which is inserted at a location 17 of the apparatus 16 through a hole 22 extending through the two components 12 and 14. The collar 21 may comprise an internally threaded nut 40 which screws onto the fastener 18 to lock the components 12 and 14 of the apparatus 16 together. The apparatus 16, including its components 12 and 14, may comprise a portion of an aircraft. In other embodiments, the apparatus 16 may comprise varying non-aircraft applications.

Figure 2:
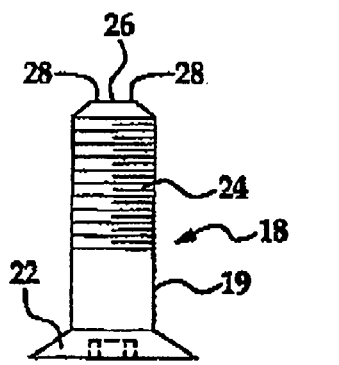
FIG. 2 shows a side view of the fastener of the embodiment of FIG. 1.
Figure 2A:
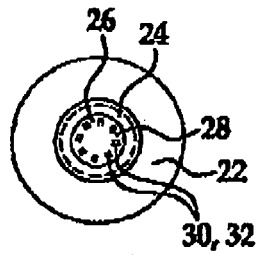
FIG. 2A shows a top view of the fastener of the embodiment of FIG. 1.
Figure 2B:
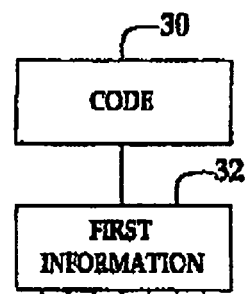
FIG. 2B shows a block diagram showing various embodiments of the first information a code of the fastener may provide to a computer.
Figure 2B:
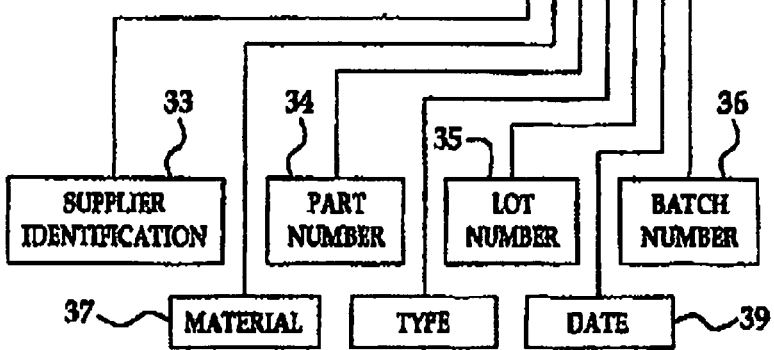

FIG. 2 shows a side-view of the fastener 18 of the embodiment of FIG. 1. FIG. 2A shows a top view of the fastener 18 of the embodiment of FIG. 1. As shown in FIGS. 2 and 2A, the fastener 18 may comprise a bolt 19 having a head 22, external threads 24, and an end surface 26. One or more portions 28 of the end surface 26 may be marked with a code 30. The code 30 may comprise laser reader markings 32 or other types of markings. FIG. 2B shows a block diagram showing the types of information the code 30 of the fastener 18 may provide. As shown, the code 30 may provide first information 32 regarding the fastener 18 such as supplier identification 33, part number 34, lot number 35, batch number 36, material 37, type 38 (which may include size), date 39, and other types of information regarding the fastener 18. In other embodiments, the fastener 18 may be in varying shapes, sizes, orientations, and configurations, and the code 30 may be on or in a varying portion of the fastener 18.

Figure 3:
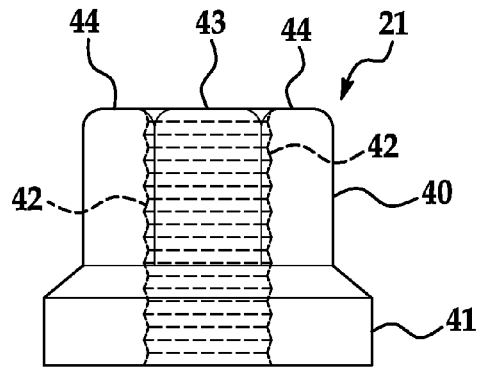
FIG. 3 shows a side view of the collar of the embodiment of FIG. 1, with the dashed lines depicting hidden elements.
Figure 3A:
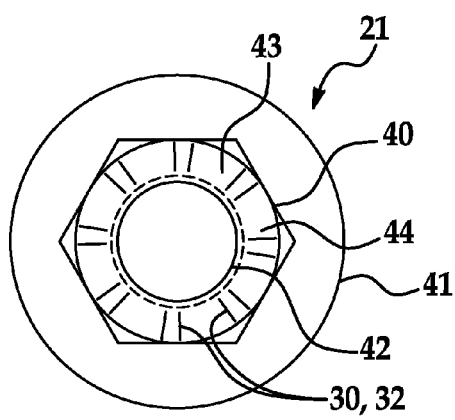
FIG. 3A shows a top view of the collar of the embodiment of FIG. 1.

FIG. 3 shows a side-view of the collar 21 of the embodiment of FIG. 1, with the dashed lines depicting hidden elements. FIG. 3A shows a top view of the collar 21 of the embodiment of FIG. 1. As shown in FIGS. 3 and 3A, the collar 21 may comprise a nut 40 having a flange 41, internal threads 42, and an end surface 43. One or more portions 44 of the end surface 43 may be marked with a code 30. The code 30 may comprise laser reading markings 32 or other types of markings. The code 30 may provide the various types of first information 32 shown in FIG. 2B regarding the collar 21. For instance, the code 30 may provide first information 32 regarding the collar 21 such as supplier identification 33, part number 34, lot number 35, batch number 36, material 37, type 38 (which may include size), date 39, and other types of information regarding the collar 21. In other embodiments, the collar may be in varying shapes, sizes, orientations, and configurations, and the code 30 may be on or in a varying portion of the collar 21.

Figure 4:
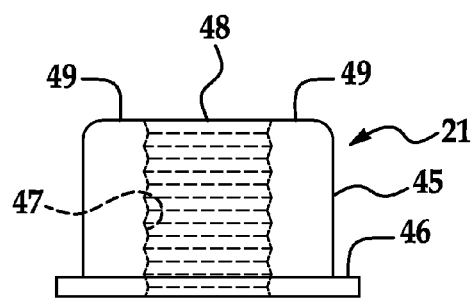
FIG. 4 shows a side view of another embodiment of a collar which may be attached to the fastener of the embodiment of FIG. 1, with the dashed lines depicting hidden elements.
Figure 4A:
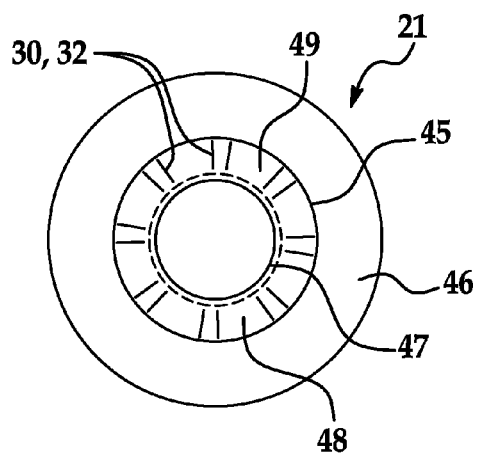
FIG. 4A shows a top view of the collar of the embodiment of FIG. 4.

FIG. 4 shows a side-view, with dashed lines depicting hidden elements, of another embodiment of a collar 21 comprising a sleeve 45 which may be attached to the fastener 18 of FIG. 1 instead of the nut 40. FIG. 4A shows a top view of the sleeve 45 of the embodiment of FIG. 4. As shown in FIGS. 4 and 4A, the sleeve 45 may comprise a flange 46, internal threads 47 (which are shown in hidden lines), and an end surface 48. One or more portions 49 of the end surface 48 may be marked with a code 30. The code 30 may comprise laser reading markings 32 or other types of markings. The code 30 may provide the various types of first information 32 shown in FIG. 2B regarding the sleeve 45. For instance, the code 30 may provide first information 32 regarding the sleeve 45 such as supplier identification 33, part number 34, lot number 35, batch number 36, material 37, type 38 (which may include size), date 39, and other types of information regarding the sleeve 45. In still other embodiments, the collar 21 may be in varying shapes, sizes, orientations, and configurations, and the code 30 may be on or in a varying portion of the collar 21.

As shown in FIG. 1, the collar 21 may be screwed onto the fastener 18 using a tool 50 such as a ratchet or other type of tool 50 which is adapted to screw the collar onto the fastener 18 to lock the components 12 and 14 together. In other embodiments, the fastener 18 may be fastened without the use of collar 21. The tool 50 may have a smart chip 51 embedded within an outer surface 52 of the tool 50. An inner surface 53 defining a hole 54 may extend linearly from an end 59 of the tool 50. The inner surface 53 may be adapted to latch onto the collar 21 to screw the collar 21 onto the fastener 18. A laser reader 55, such as an optical laser reader, may be disposed within the hole 54. The laser reader 55 may be adapted to scan and read the code 30 of the fastener 18 and/or the collar 21 in order to retrieve the first information 32 regarding the fastener 18 and/or the collar 21. The first information 32 may be stored in the smart chip 51. The smart chip 51 may be in wireless contact with a computer 56 which has access and is in communication with one or more databases 57.

Figure 5:
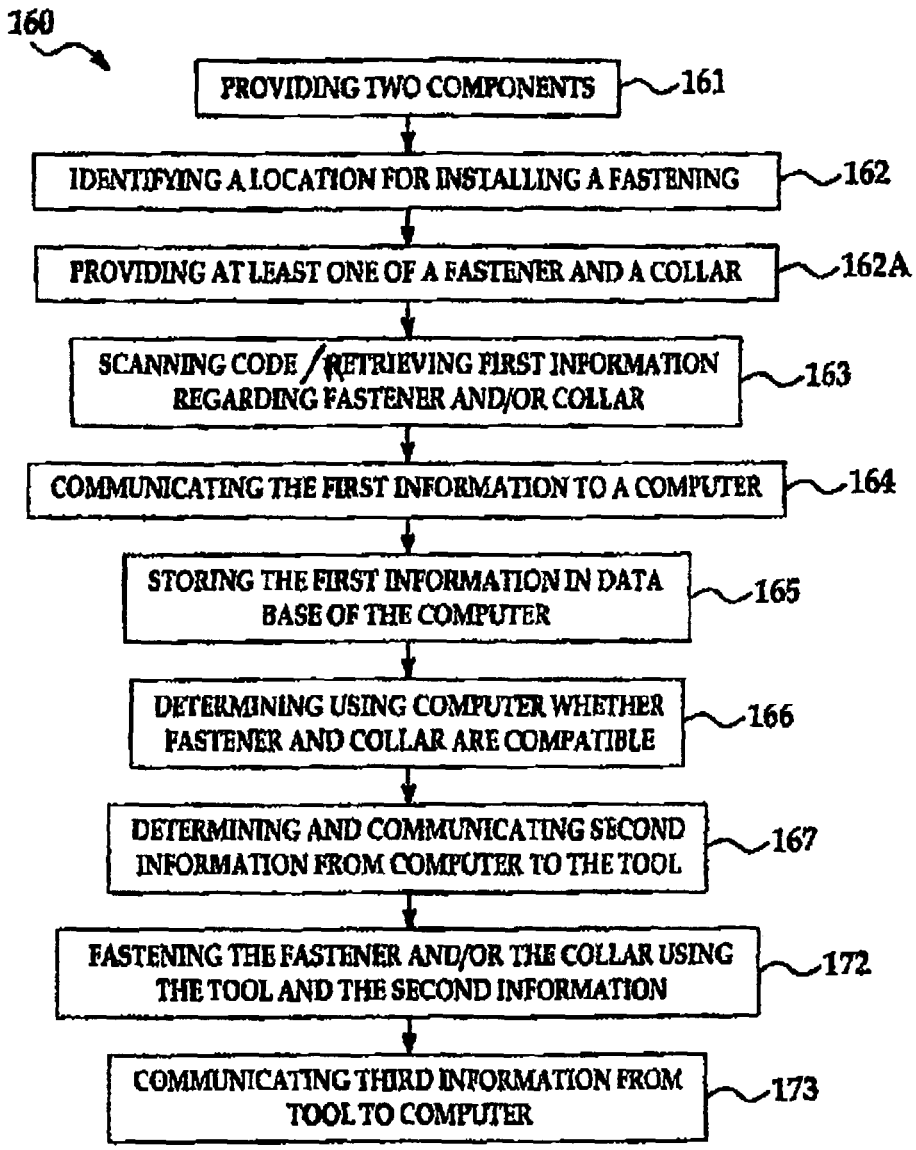
FIG. 5 shows a flowchart of one embodiment of a method of installing a fastener.

FIG. 5 shows a flowchart of one embodiment of a method 160 of installing a fastener 18. In one step 161, two components 12 and 14 may be provided. The components 12 and 14 may be parts of an aircraft. In another step 162, a location 17 may be identified for installing a fastener 18 to assemble the components. In an additional step 162A, at least one of a fastener 18 and a collar 21 may be provided. A one-piece fastener 18 may be used without a collar 21, or a two-piece fastener 18 may be used with a collar 18. The fastener 18 may be a bolt 19. The collar 21 may be a nut 40 or a sleeve 45. One or more of the fastener 18 and/or the collar 21 may have a code 30 which may be one or more laser markings 32.

In yet another step 163, the code 30 may be scanned and first information 32 may be retrieved regarding at least one of the fastener 18 and/or the collar 21. The code 30 may be scanned using a laser reader 55 of a tool 50. The first information 32 may comprise supplier identification 33, part number 34, lot number 35, batch number 36, material 37, type 38 (which may include size), date 39, and other types of information regarding the fastener 18 and/or the collar 21. The first information 32 scanned by the laser reader 55 may be transferred to the smart chip 51 of the tool 50.

In an additional step 164, the first information 32 may be communicated from the smart chip 51 of the tool 50 to a computer 56. The computer 56 may have access to one or more databases 57. In yet another step 165, the first information 32 may be stored in the one or more databases of the computer 56. In step 166, if a two-piece fastener 18 is used with a collar 21, the computer 56 may determine based on the first information 32 whether the fastener 18 and the collar 21 are compatible with one another. If the fastener 18 and the collar 21 are not compatible, the computer 56 may send a signal to the tool 50 to not install the fastener 18 to the collar 21. If the fastener 18 and the collar 21 are compatible, the computer 56 may proceed to step 167. In other embodiments, step 166 may be skipped, and a determination may not be made as to compatibility.

Figure 6:
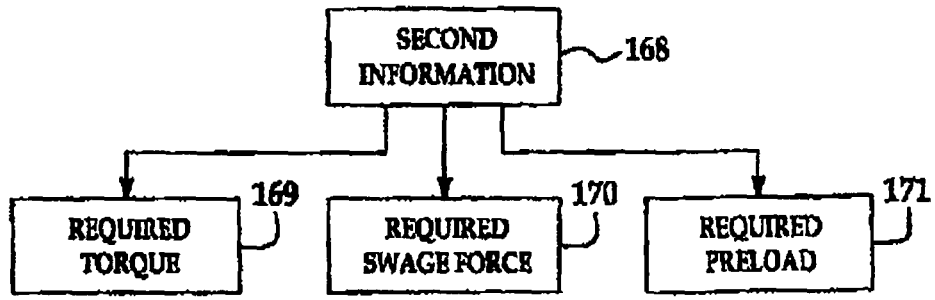
FIG. 6 shows a block diagram disclosing various embodiments of second information regarding the fastener and/or the collar which may be communicated from a computer to a tool.

In step 167, the computer 56 may determine and communicate second information 168 to the tool 50 based on the first information 32. As shown in FIG. 6, which shows a block diagram showing the types of second information 168, the second information 168 may comprise at least one of required torque 169, required swage force 170, required preload 171, or other types of information. In such manner, based on the first information 32 regarding the fastener 18 and/or the collar 21, the computer may determine, by accessing database 57, the appropriate torque 169, swage force 170, and/or preload 171 to apply to the fastener 18 and/or the collar, and may communicate that second information 168 to the tool 50.

Figure 7:
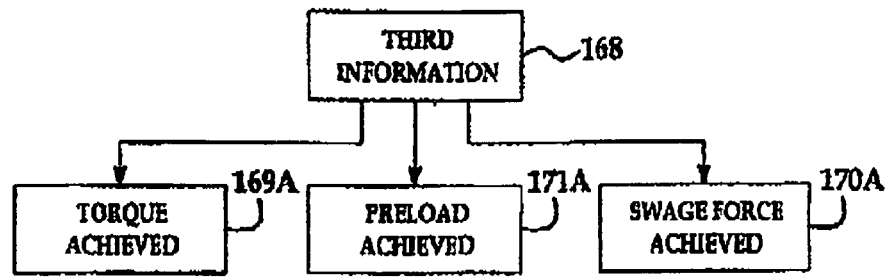
FIG. 7 shows a block diagram disclosing various embodiments of third information regarding the fastener and/or the collar which may be communicated to a computer from a tool.

In still another step 172, the fastener 18 and/or collar 21 may be fastened using the tool 50 based on the communicated second information 168. In such manner, the fastener 18 and/or collar 21 may be fastened with the appropriate torque 169, swage force 170, and/or preload 171 for that type of fastener 18 and/or collar 21. In an additional step 173, the tool 50 may communicate third information 174 to the computer 56. As shown in FIG. 7, which shows a block diagram showing the types of third information 174, the third information 174 may comprise an amount of at least one of torque 169A, preload 171A, and swage force 170A which the tool 50 actually applied to the fastener 18 and/or the collar 21 during installation. The computer 56 may store the third information 174 in database 57.

Figure 8:
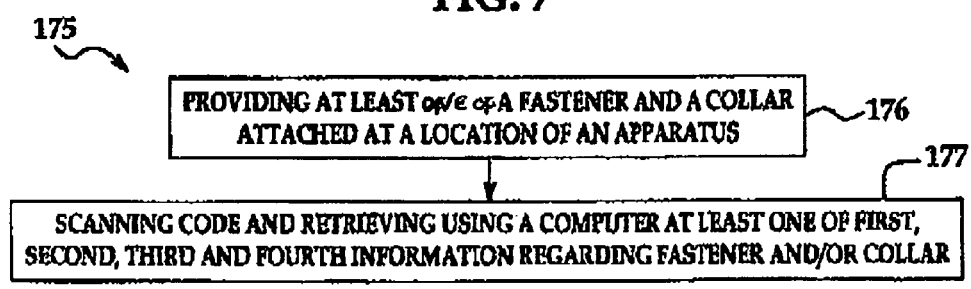
FIG. 8 shows a flowchart of an embodiment of one embodiment of a method of tracking and monitoring a fastener in an apparatus.
Figure 9:
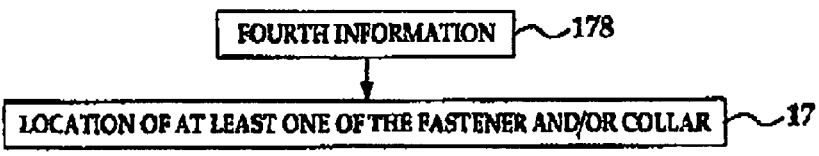
FIG. 9 shows a block diagram disclosing one embodiment of fourth information which a computer may contain regarding a fastener and/or a collar.

FIG. 8 shows a flowchart of an embodiment of one embodiment of a method 175 of tracking and monitoring a fastener 18 in an apparatus 16. In one step 176, at least one of a fastener 18 and a collar 21 may be provided attached at a location 17 of the apparatus 16. At least one of the fastener 18 and/or the collar 21 may have a code 30. In another step 177, the code 30 may be scanned and at least one of first information 32, second information 168, third information 174, and fourth information 178 regarding at least one of the fastener 18 and/or the collar 21 may be retrieved using a computer 56. As shown in FIG. 9, which shows a block diagram showing the fourth information 178, the fourth information 178 may comprise the location 17 of at least one of the fastener 18 and/or the collar 21.

Figure 10:
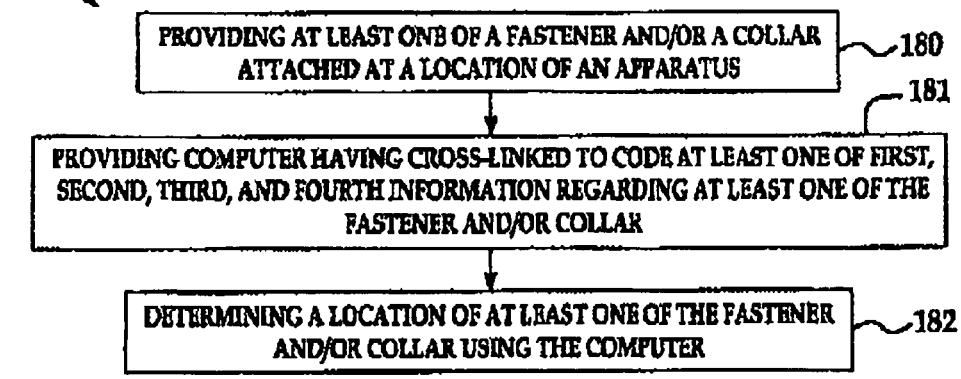
FIG. 10 shows one embodiment of a method of locating a fastener in an apparatus.

FIG. 10 shows one embodiment of a method 179 of locating a fastener 18 in an apparatus 16. In one step 180, at least one of a fastener 18 and a collar 21 are provided attached at a location 17 of the apparatus 16. At least one of the fastener 18 and/or the collar 21 have a code 30. In step 181, a computer 56 is provided having cross-linked to the code 30 at least one of first information 32, second information 168, third information 174, and fourth information 178 regarding at least one of the fastener 18 and/or the collar 21. In one embodiment, at least two of the first information 32, second information 168, third information 174, and fourth information 178 are cross-linked in the computer 56. In step 182, a location 17 of at least one of the fastener 18 and/or the collar 21 is determined using the computer 56.

In another embodiment, as shown in FIG. 1, a fastening apparatus 10 may include at least one of a fastener 18 and/or a collar 21 having a code 30. The code 30 may be cross-linked in a database 57 of a computer 56 to at least one of first information 32, second information 168, third information 174, and fourth information 178 regarding the at least one fastener 18 and/or collar 21.

One or more embodiments of the disclosure may reduce and/or eliminate one or more problems of one or more of the existing fastening apparatus and/or methods of installation, location, tracking, and/or monitoring. One or more embodiments of the disclosure may save time, may increase reliability, may decrease error, may improve efficiency, may reduce cost, and/or may reduce one or more other types of problems of one or more of the existing fastening apparatus and/or methods of installation, location, tracking, and/or monitoring.

Figure 11:
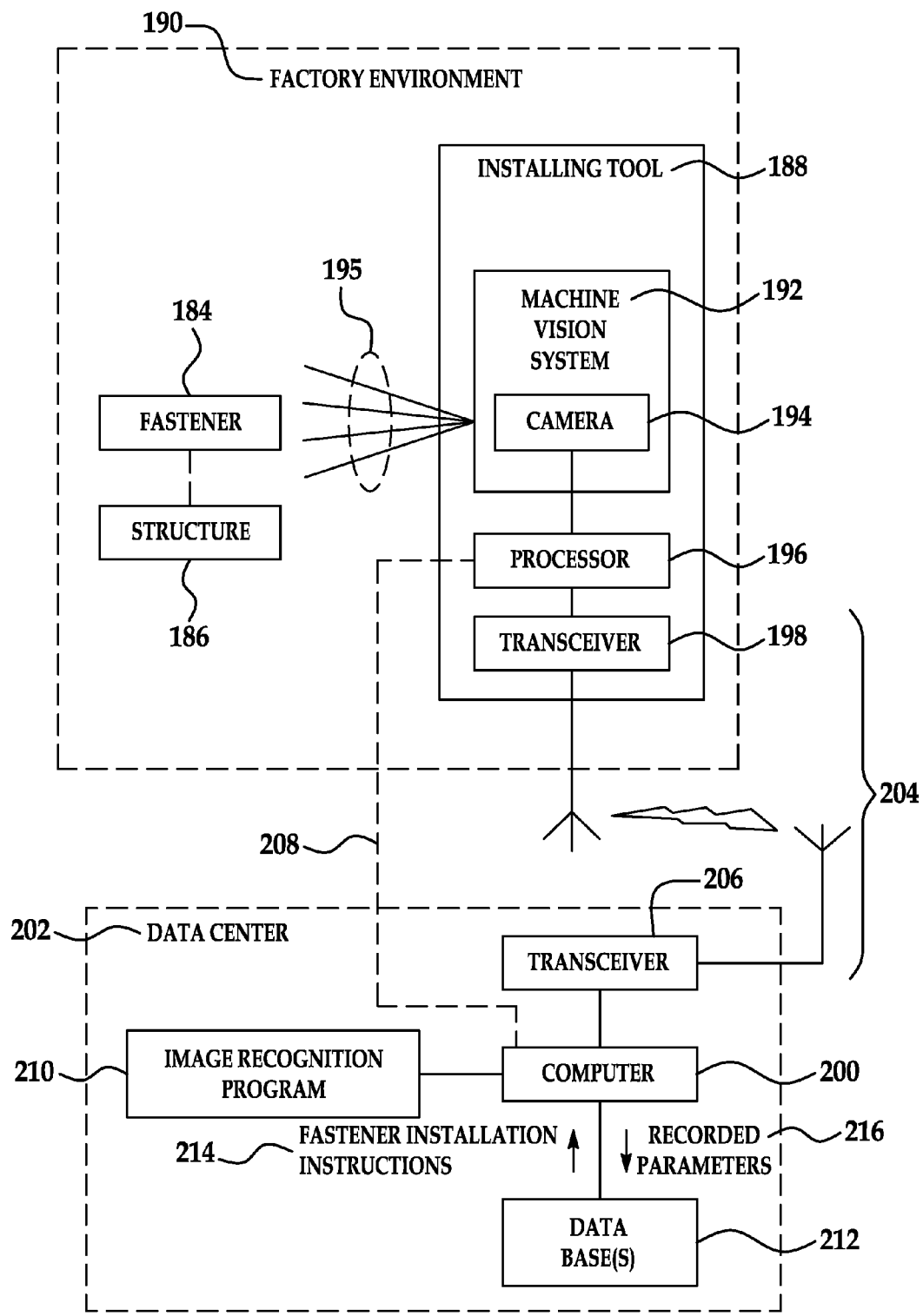
FIG. 11 is an illustration of a block diagram of an intelligent fastener system according to another embodiment.

Attention is now directed to FIG. 11 which illustrates another embodiment in which a fastener 184 is automatically identified by analyzing an optical image of the fastener 184 recorded by a machine vision system 192 that may include a camera 194. The camera 194 may comprise a digital camera or similar device employing electronic recording means, such as a CCD (charge coupled device) (not shown) which records an image of the fastener 184 in electronic form. However, other forms of machine vision systems 192 and cameras 194 may be employed. In this embodiment, the machine vision system 192 as well as a processor 196 and transceiver 198 may be integrated into, or mounted on an installation tool 188 used to install the fastener 184 in a factory environment 190. The installation tool 188 may be similar to that previously described in connection with FIG. 1 which may be used to install the fastener 184 on a structure 186, such as the apparatus 16 shown in FIG. 1. The fastener 184 may comprise, without limitation, a nut, a bolt or a rivet, to name only a few.

In this example, the camera 194 may be mounted on the installation tool 188 such that aiming or aligning the installation tool 188 toward the fastener 184 brings the fastener 184 into the field of view 195 of the camera 194 so that an optical image of the fastener 184 may be recorded by the camera 194. The optical image of the fastener 194 recorded electronically by the camera 194, sometimes also referred to herein as an "electronic image", is delivered to the processor 196, which may comprise a microprocessor similar to the smart chip 51 previously described in connection with FIG. 1. The processor 196 may temporarily store the recorded image and package it for wireless transmission to a data center 202 through a wireless communication system 204. The communication system 204 includes the transceiver 198 on the installation tool 188, as well as a transceiver 206 located at the data center 202. In other embodiments, the communication link between the installation tool 188 and the data center 202 may comprise a hard wire connection 208, rather than the wireless communication system 204.

The electronic image transmitted from the installation tool 188 to the data center 202 is received by a computer 200 at the data center 202. The computer 200 may employ an image recognition software program 210 which analyzes features of the recorded image in order to recognize and thereby identify the particular fastener 184 whose image has been recorded. The image recognition program 210 may employ reference information contained in a database 212 which includes known features of each of a plurality of the fasteners 184. Once a fastener 184 has been recognized by the computer 200, the computer 200 retrieves a set of fastener installation instructions 214 from the database 212 which corresponds to the particular fastener 184 that has been identified. These fastener installation instructions 214 may include, among other things, target installation parameters such as preload, torque or swage force. After being retrieved from the database 212, the computer transmits the fastener installation instructions 214 to the installation tool 188, either via the wireless communication system 204 or the hardwire connection 208. The fastener installation instructions 214 are received by the processor 196 which then controls operation of the installation tool 188 in a manner to install the fastener 184 according to the installation instructions 214, including the target installation parameters. Once the fastener 184 has been installed by the tool 188, sensors (not shown) on the installation tool 188 may record the actual values of the installation parameters, and the processor 196 sends these recorded parameters to the computer 200 at the data center 202. The computer 200 stores the recorded parameters in electronic files that may form part of the database 212. FIG. 12 illustrates a typical computer display screen 218 showing a list 220 of fastener identification numbers, each of which may be selected to display the target or nominal values 228, and actual "as installed" values 230 of the installation parameters, which in the illustrated example, comprise preload 222, torque 224 and swage force 226.

Figure 13:
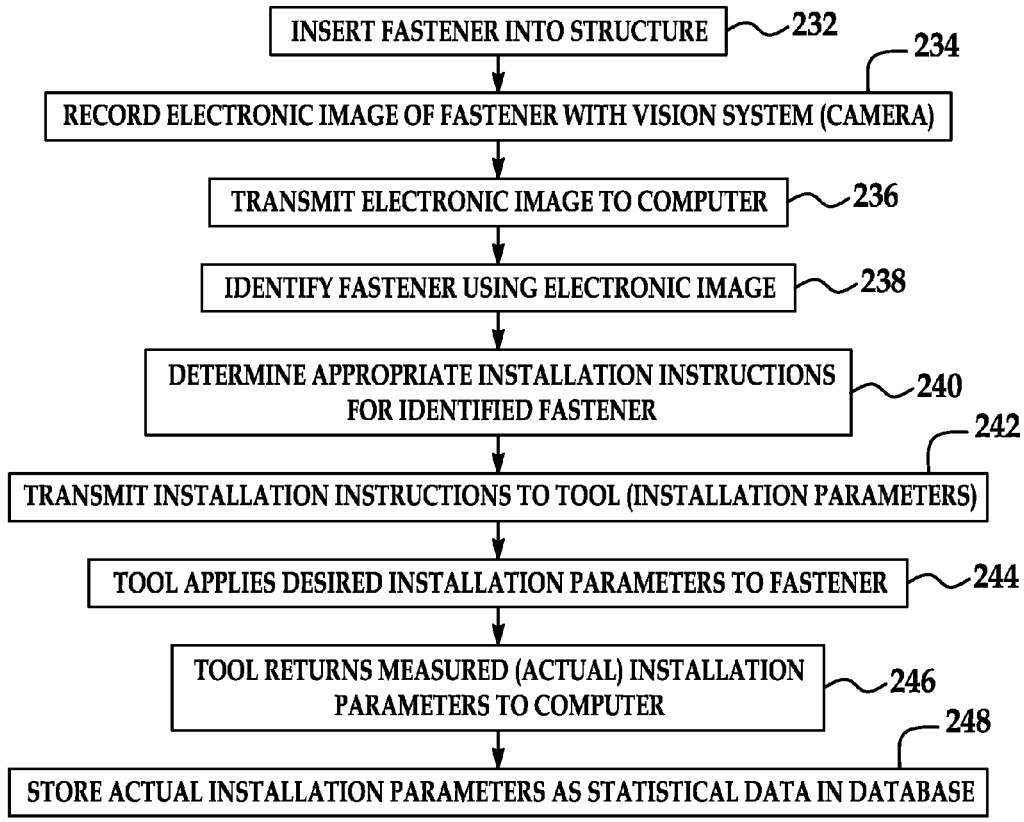
FIG. 13 is an illustration of a flow diagram of a method of installing fasteners using the intelligent fastener system.

FIG. 13 illustrates the basic steps of a method of installing fasteners using the intelligent fastener system shown in FIG. 11. Beginning at 232, the fastener 182 is inserted into the structure 184, then at 234, an electronic image of the fastener 182 is recorded by the machine vision system 192 using the camera 194. At 236, the electronic image is transmitted to the computer 200 at the data center 202 where the particular fastener 182 is identified at 238 using the electronic image. At step 240, the computer 200 determines the appropriate installation instructions 214 for the identified fastener by retrieving a file from the database 212 which contains these instructions for the identified fastener. The fastener installation instructions 214 are then transmitted at 242 to the installation tool 188 in the factory environment 190. As previously mentioned, the installation instructions 214 may include a set of installation parameters as well as other information and/or instructions which direct the operation of the installation tool 188. At step 244, the installation tool 188 installs the fastener 182 in conformance with the installation instructions, including installation parameters. At step 246, after the fastener 182 has been installed, the installation tool 188 returns the measured or actual installation parameters to the computer 200 which, at step 248 stores these measured installation parameters as statistical data in the database 212.

Figure 14:
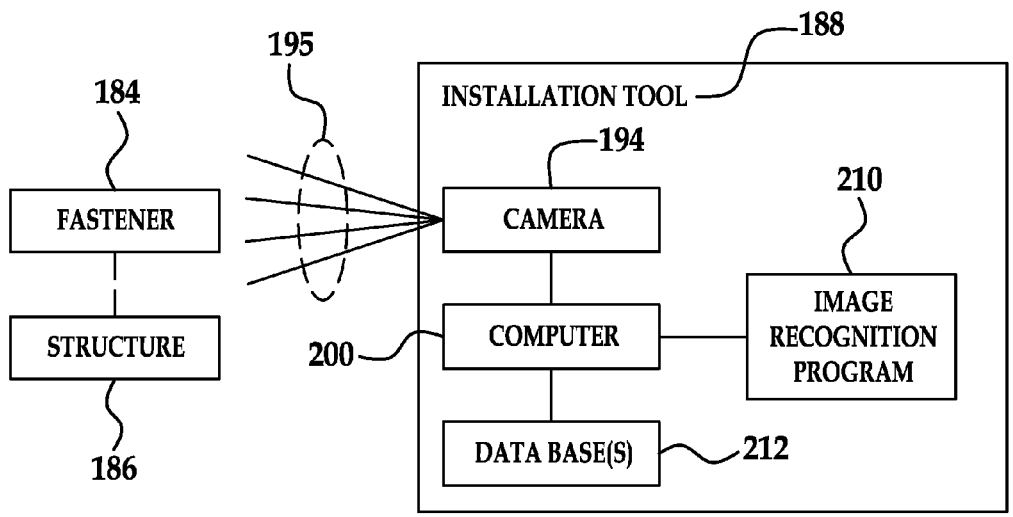
FIG. 14 is an illustration of a block diagram of another embodiment.

Attention is now directed to FIG. 14 which illustrates another embodiment of the intelligent fastener system. In this embodiment, the computer 200, image recognition program 210 and database 212 are integrated into or mounted on the installation tool 188, so that identification of the fastener 184 and generation of the installation instructions 214, as well as the recording of the actual installation parameters may be performed entirely on the installation tool 188 in the factory environment 190. The installation instructions 214 as well as the recorded parameters 216 may be uploaded or downloaded, from time-to-time using any of various means, such as, without limitation, a flash memory (not shown) or a simple connection to a data processing system (not shown).

Figure 15:
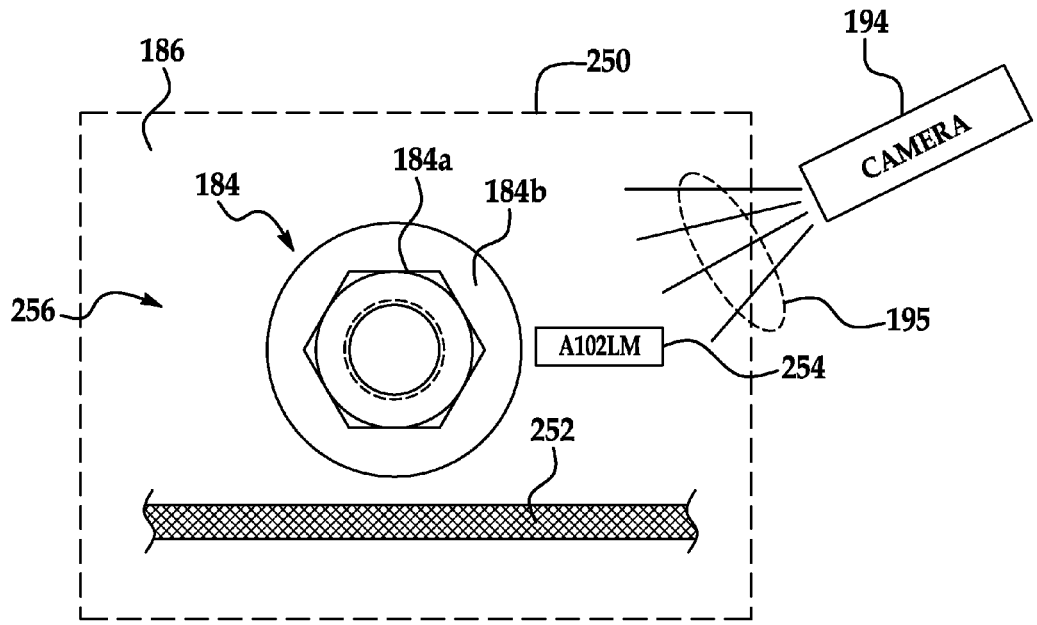
FIG. 15 is an illustration of a typical installation environment showing a fastener and features recorded by a camera forming part of the intelligent fastener system.

Referring now to FIG. 15, it may be possible to identify a particular fastener 184 by recognizing features in addition to those of the fastener 184 contained in a recorded image. For example, the camera 194 may be adjusted such that its field of view 195 encompasses an area 250 that includes features which surround or are immediately adjacent to the fastener 184. In the illustrated example, two such features comprise an upstanding rib 252 immediately adjacent the fastener 184, and an alpha-numeric identifier 254 visible on the surface 256 on the structure 186 in which the fastener 184 is being installed. The recorded image of the area 250 is analyzed by the previously discussed image recognition program 210 in order to verify or identify the fastener 184. The program 210 may search for the presence of particular combinations of features, such as the shape of the fastener head 184a, the presence of fastener flange 184b, the presence of the rib 252 and the alpha-numeric identifier 254.

Figure 16:
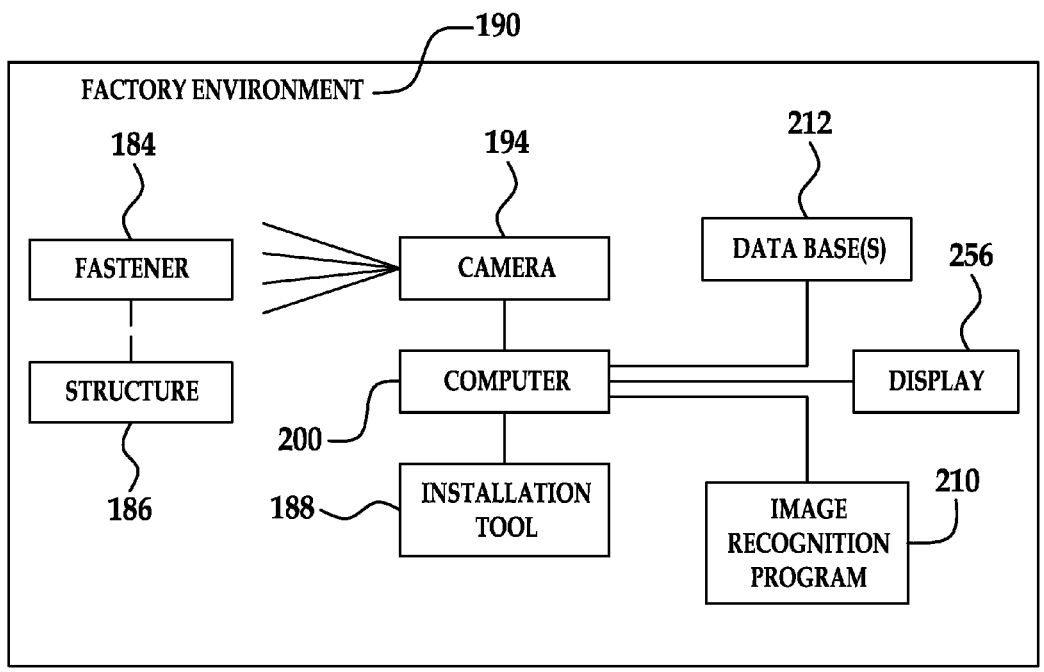
FIG. 16 is an illustration of a block diagram of another embodiment of the intelligent fastener system.

FIG. 16 illustrates still another embodiment of the intelligent fastener system in which the camera 194, computer 200, databases 212 and the image recognition program 210 are located locally in the factory environment 190, in the area of the installation tool 188. A local display 256 may be coupled with the computer 200 to allow an installer to view the recorded image, as well as installation instructions 214 and recorded parameters 216 in order for the installer to visually verify that a fastener 184 has been properly installed.

Figure 17:
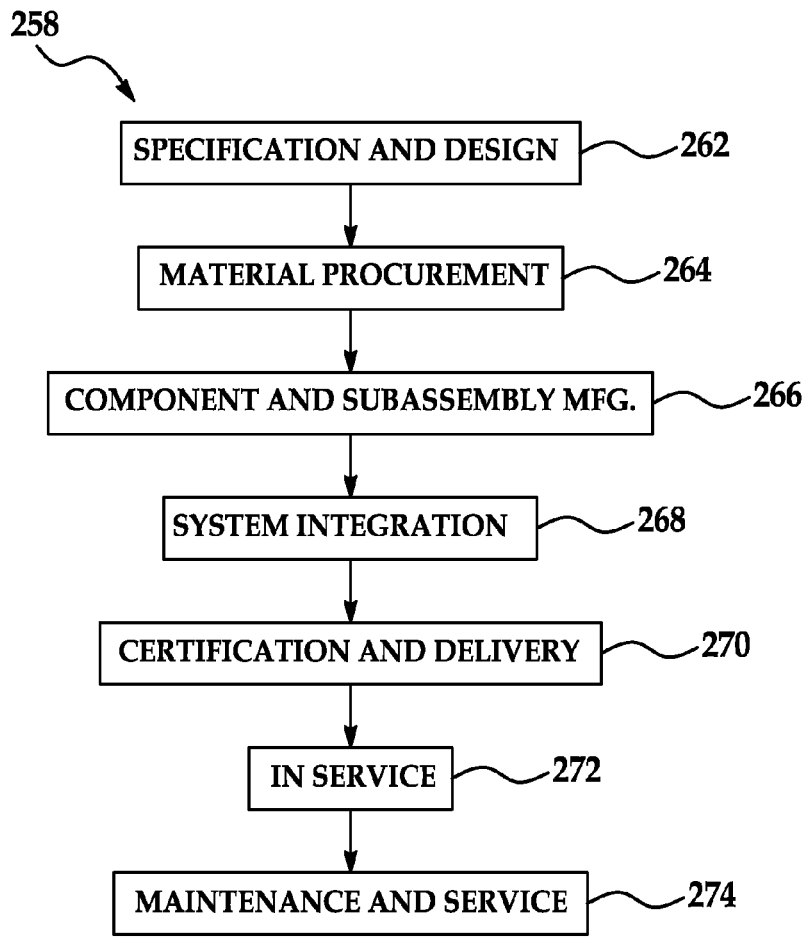
FIG. 17 is an illustration of a flow diagram of aircraft production and service methodology.
Figure 18:
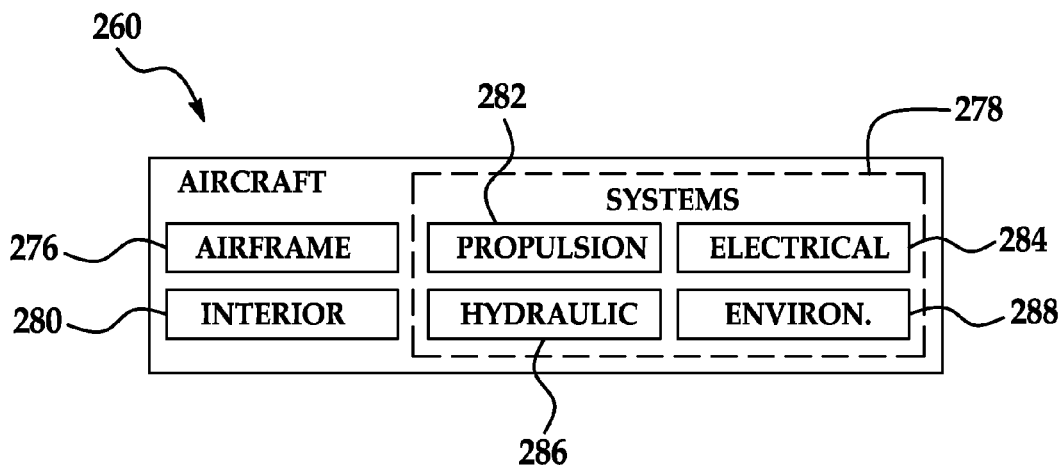
FIG. 18 is an illustration of a block diagram of an aircraft.

Embodiments of the disclosure may find use in a variety of potential applications, particularly in the transportation industry, including for example, aerospace, marine and automotive applications. Thus, referring now to FIGS. 17 and 18, embodiments of the disclosure may be used in the context of an aircraft manufacturing and service method 258 as shown in FIG. 17 and an aircraft 260 as shown in FIG. 18. During pre-production, exemplary method 258 may include specification and design 262 of the aircraft 260 and material procurement 264. The disclosed method may be specified for use during the specification and design 262 of the aircraft 260. During production, component and subassembly manufacturing 266 and system integration 268 of the aircraft 260 takes place. The disclosed method and apparatus may be used to install fasteners during the component and subassembly manufacturing process 266. Thereafter, the aircraft 260 may go through certification and delivery 270 in order to be placed in service 272. While in service by a customer, the aircraft 260 is scheduled for routine maintenance and service 274 (which may also include modification, reconfiguration, refurbishment, and so on). Fasteners may be installed on the aircraft 260 according to the disclosed method during the maintenance and service 274.

Each of the processes of method 258 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 18, the aircraft 260 produced by exemplary method 258 may include an airframe 276 with a plurality of systems 278 and an interior 280. Fasteners installed according to the disclosed method and apparatus may be used in the airframe 276 and within the interior 280. Examples of high-level systems 278 include one or more of a propulsion system 282, an electrical system 284, a hydraulic system 286, and an environmental system 288. Any number of other systems may be included. Although an aerospace example is shown, the principles of the disclosure may be applied to other industries, such as the marine and automotive industries.

Systems and methods embodied herein may be employed during any one or more of the stages of the production and service method 258. For example, components or subassemblies corresponding to production process 266 may be assembled using fasteners installed according to the disclosed method while the aircraft 260 is in service. Also, one or more apparatus embodiments, method embodiments, or a combination thereof may be utilized to install fasteners during the production stages 266 and 268, which may substantially expedite assembly of or reduce the cost of an aircraft 260. Similarly, one or more of apparatus embodiments, method embodiments, or a combination thereof may be utilized while the aircraft 260 is in service, for example.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of installing a fastener on a structure, comprising:
    recording an optical image that includes the fastener;
    identifying the fastener based on at least one shape of fastener physical features in the recorded image and based on at least one upstanding feature on the structure adjacent to the fastener in the recorded image;
    retrieving electronic fastener installation parameters based on the identity of the fastener; and
    using the electronic fastener installation parameters to install the fastener on the structure.

2. The method of claim 1, wherein identifying the fastener is performed by a computer operating an image recognition program.

3. The method of claim 1, wherein recording the image is performed electronically.

4. The method of claim 2, wherein retrieving the electronic fastener installation parameters is performed by the computer.

5. The method of claim 1, further comprising:
    wirelessly transmitting the recorded image to a computer, and
    said identifying the image is performed by the computer.

6. The method of claim 1, further comprising:
    identifying the at least one feature on the structure adjacent to the fastener.

7. A method of installing a fastener on a structure using an installation tool, comprising:
    recording electronically an optical image of the fastener;
    transmitting the recorded image to a computer;
    using the computer to identify the fastener based on fastener features in the recorded image;
    determining installation instructions for the identified fastener;
    transmitting the installation instructions from the computer to a processor on the installation tool;
    controlling operation of the installation tool with the processor based on the installation instructions; and
    using the installation tool to install the fastener.

8. The method of claim 7, wherein using the computer to identify the fastener includes processing the recorded image using an image recognition program.

9. The method of claim 7, wherein recording the image is performed by a vision system.

10. The method of claim 7, wherein determining the installation instructions is performed by the computer.

11. The method of claim 7, wherein transmitting the recorded image to a computer and transmitting the installation instructions from the computer to the processor on the installation tool are each performed wirelessly.

12. The method of claim 7, further comprising:
    recording an optical image of at least one feature on the structure, and
    wherein identifying the fastener includes identifying the feature using the recorded image of the feature.

13. The method of claim 7, further comprising:
    placing the fastener on the structure at a location where the fastener is to be installed, and
    wherein the image of the fastener is recorded after the fastener has been placed on the structure.

14. The method of claim 7, further comprising:
    using the installation tool to record at least one parameter related to the fastener installation;
    transmitting the recorded parameter to the computer; and
    using the computer to store the recorded parameter.

15. Apparatus for installing fasteners in a structure, comprising:
    means for recording an optical image of a fastener to be installed;
    a programmed computer for identifying the fastener based on fastener features in the recorded image of the fastener and for generating installation instructions for the identified fastener; and
    an installation tool for installing the fasteners on the structure according to the installation instructions, wherein the means for recording an optical image and the programmed computer are integrated into the installation tool.

16. The apparatus of claim 15, further comprising:
    an image recognition program integrated into the installation tool used by the computer to identify the fastener.

17. The apparatus of claim 15, wherein the recording means includes a camera.

18. The apparatus of claim 15, further comprising:
    a database integrated into the installation tool including installation parameters for each of a plurality of fasteners.

19. Apparatus for installing fasteners on an aircraft structure, comprising:
    a vision system including a camera for electronically recording an optical image of a fastener to be installed on the structure and the structure adjacent to the fastener;
    an image recognition program for recognizing the fastener;
    a programmed computer including the image recognition program for identifying the fastener based on at least one shape of fastener physical features and at least one upstanding feature on the structure adjacent to the fastener in the recorded image, the computer further including data files for storing fastener installation instructions and fastener installation parameters;
    a display connected to the programmed computer;

an installation tool for installing the fasteners on the structure according to the installation instructions and fastener installation parameters; and a communication system for wirelessly transmitting the recorded image from the vision system to the computer, for wirelessly transmitting the installation instructions and fastener installation parameters from the computer to the installation tool, and for wirelessly transmitting recorded parameters from the installation tool to the computer, wherein the display displays both the fastener installation parameters and the recorded parameters.

* * * * *